United States Patent Office 3,544,820
Patented Dec. 1, 1970

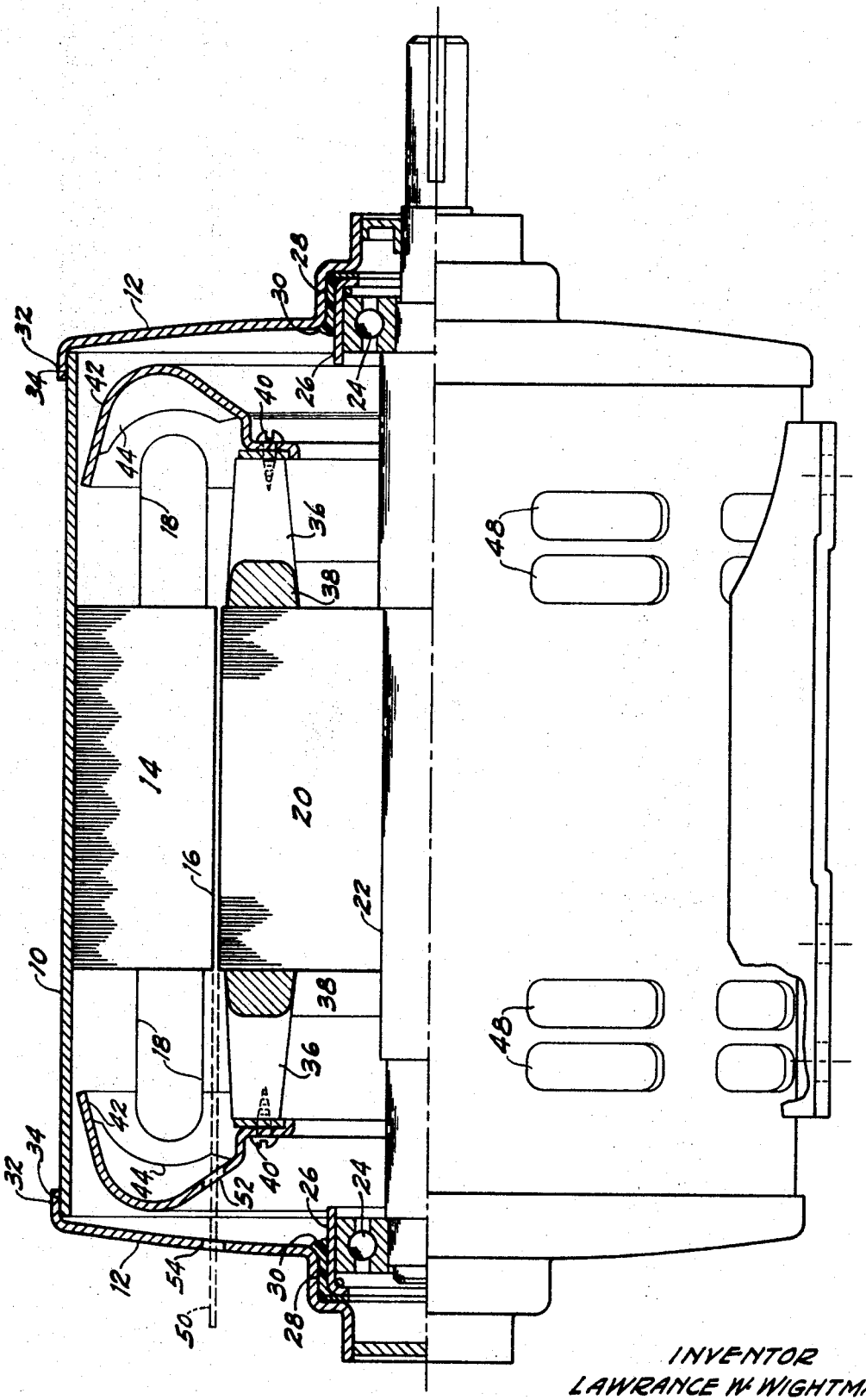

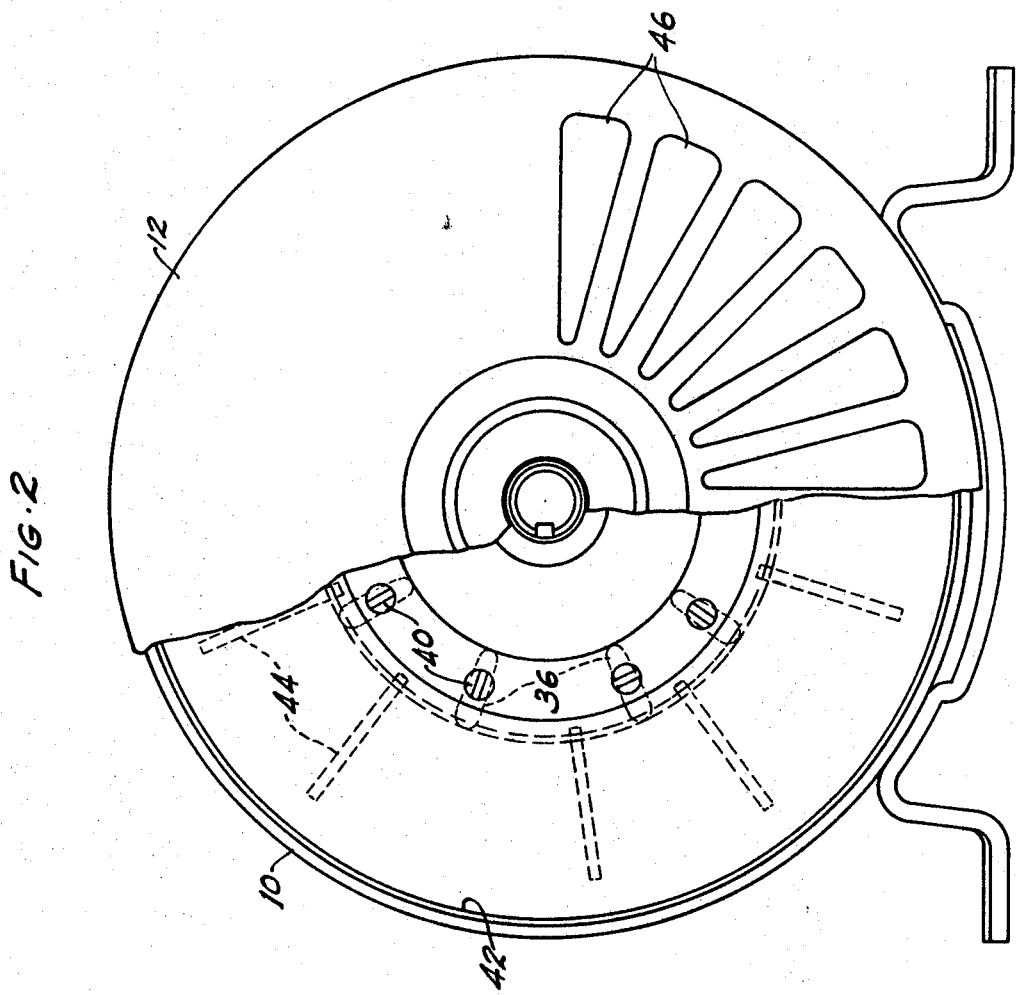

3,544,820
ELECTRIC MOTOR WITH END SHIELD AND BEARING ARRANGEMENT AND COOLING SYSTEM
Lawrance W. Wightman, St. Louis County, Mo., assignor to Emerson Electric Co., St. Louis, Mo., a corporation of Missouri
Filed Jan. 8, 1969, Ser. No. 789,746
Int. Cl. H02k 5/10, 5/16, 15/14
U.S. Cl. 310—42      4 Claims

ABSTRACT OF THE DISCLOSURE

A "take apart," ball bearing, electric motor in which dimensional and alignment tolerances are accumulated in relatively small diameter, annular, cemented joints between the bearings and bearing supporting end shields, in which the end shields are closely fitted at their peripheries to the ends of a cylindrical stator shell and detachably connected thereto by a very thin, frangible, cemented joint, and in which large-diameter cooling fans rotate in the space at the ends of the casing usually occupied by through bolts or attaching lugs.

---

This invention relates to dynamoelectric machines and particularly to "take apart," ball-bearing, electric motors.

The method of achieving a high degree of concentricity and alignment of the rotor and bearings with the stator bore by loosely fitting the peripheries of bearing supporting end shields on the stator shell and cementing them to the shell with a structurally strong epoxy cement after the rotor has been shimmed in a concentric and aligned position has been proposed. This method, while providing a low-cost satisfactory construction for smaller, permanently assembled, "throw-away" motors, is not, however, suitable for larger-sized, "take apart" motors, the initial cost of which justifies their disassembly and repair. Moreover, the amount of cement required to fill the annular spaces between the peripheries of loosely fitting end shields and the stator shell on large size motors is much greater and the cost of suitable cement for this purpose is relatively high.

It is an object of the present invention to provide a "take apart," ball bearing, electric motor construction in which bearing supporting end shields are closely fitted at their peripheries on a stator shell and detachably connected thereto by a very thin, frangible, cemented joint and in which relatively small diameter, annular, cemented joints between the motor bearings and the end shields permit the lateral movement of the bearings required to position the rotor concentrically and in alignment in the stator bore.

A further object is to detachably connect the end shields to the stator shell without the use of through bolts or lugs and to utilize the space occupied by such attaching means for the operation of large-diameter cooling blowers.

Further objects and advantages will appear from the following description when read in connection with the accompanying drawings.

In the drawings:

FIG. 1 is a half-sectionalized, side elevational view of an A.C. electric motor constructed in accordance with the present invention; and FIG. 2 is a right-hand end elevational view of the electric motor shown in FIG. 1 with a portion of the end shield broken away.

Referring to the drawing, the motor has a casing comprising a cylindrical stator shell 10 and end shields 12 attached to the ends thereof. Tightly fitted in the shell 10 by press fitting or shrink fitting is a stator core 14 having a circular periphery and an axial bore 16. The stator further includes windings, the end turns of which are shown in outline at 18. Mounted for rotation in the bore 16 is a rotor 20 having a shaft 22 on the end portions of which are press fitted ball bearings 24.

The outer races of the ball bearings 24 are slip fitted into bearing locating rings 26, and the locating rings 26 are received in loosely fitting relationship in internal recesses 28 formed in end shields 12. The bearing locating rings 26 are permanently and rigidly fixed in the end shield recesses by an adhesive, structural cement 30, which is applied in soft paste form and subsequently hardened by the application of heat.

The end shields 12 have peripheral, axially extending, rim portions 32 which are closely fitted in push-fit relationship on the ends of the stator shell 10. The end shields are detachably connected to the shell 10 by a very thin layer of adhesive cement 34, which securely retains the end shields in assembled position on shell 10 under operating conditions but permits their removal when sufficient axial force is applied by suitable tools. Presently, there are available commercially adhesive epoxy resin cements in thin liquid form which, when applied to the joints between the closely fitting end shield rims and shell, disperse readily over the entire surface of the joints by capillarity and set up or harden in a relatively short time when suitably heated to provide the frangible connection desired.

The rotor is provided with circularly arranged, radial blower vanes 36 at each end thereof cast integral with rotor end rings 38. The vanes 36 extend axially outward from the rotor end rings and coextend radially with outer portions of the end faces of the rotor 20. Attached to the outer ends of vanes 36 by screws 40 are annuluses 42 which coextend radially with the end faces of the stator and have a running fit at their peripheries with the wall of shell 10. The annuluses 42 are of generally concavo-convex, cross-sectional configuration with the concave sides thereof facing the ends of the stator, and they are provided with circularly arranged radial vanes 44 extending across the concave sides thereof.

The end shields 12 are provided with air vents 46 in the lower halves thereof, and the stator shell 10 is provided with peripherally spaced air vents 48 in the lower half thereof positioned axially along the shell between the peripheral edges of the annuluses 42 and the ends of the stator 14. By limiting the air vents to the lower halves of the shell and end shields and by forming the end shield walls at an acute angle to the vertical and arranging the radially extending vents 46 therein, as shown in FIG. 2, the commercial requirements for drip-proof construction are met.

In assembling the motor, the stator assembly is press fitted or shrink fitted into the shell 10. Thereafter, the rotor, with the ball bearings fixed on the shaft 22 and the bearing locating rings 26 slip fitted on the bearings, is entered into the stator bore 16 and temporarily fixed concentrically and axially therein by means of removable shims 50 entered between the rotor and stator bore. The cement 30, in soft paste form, is now applied to the outer surfaces of bearing locating rings 26, and the end shields 12 are then moved axially into assembled position with their rim portions 32 fitted in push fit relationship on the ends of shell 10. The inward axial movement of end shields 12 distributes the cement 30 over the surfaces of the locating rings and the axial wall surfaces of the end shield recesses, there having been sufficient cement applied to the outer surfaces of the end shields to completely and solidly fill the annular space between the loosely fitting locating rings and recess walls.

Cement 34, in liquid form, is now applied between the end shield rim portions 32 and the shell 10. This is a simple procedure inasmuch as the cement disperses over the entire area of these contiguous surfaces by capillarity. Heat is now applied to the cement 30 and cement 34 by any suitable means, and the cement is set or hardened. Preferably, it is applied by annular heaters which overlie the cemented joints and locally heat the cemented joints. The shims 50, which extend exteriorly of the casing through access apertures 52 in the left-hand annulus 42 and access apertures 54 in the left-hand end shield 12, are now withdrawn. The access holes 54 in the end shield may be suitably plugged, if desired, after withdrawal of the shims.

If, upon tests after assembly, it becomes necessary to disassemble the motor at the point of manufacture or subsequently after field service to make alterations or repairs, this is readily accomplished by breaking one or both of the frangible joints between the end shields and shell with suitable tools. Upon reassembling the motor it is not necessary to again shim the rotor in the stator bore to position it concentrically therein, because concentricity and alignment of the bearing locating rings was previously established and fixed with reference to the periphery of the end shields and their close fit on the shell 10. It is required, however, that the previously cemented surfaces of the end shields and shell be cleaned with a suitable solvent and, preferably, that the peripheries of the end shields and adjacent shell wall be marked before disassembly so that they may be replaced in the same angular position with respect to the motor axis.

In operation, ambient air is drawn into the ends of the motor casing through vents 46 in the end shields and moved radially outward at high velocity by vanes 36 and 44. The radially outward moving air, after moving over the end faces of the rotor, is, for the most part, deflected axially outward by the end turns 18 of the stator winding, whereupon it encounters the concave faces of annuluses 42 and is again deflected axially inward around and over the winding end turns and against the wall of shell 10 and the end faces of the stator core. Circular motion is also imparted to the air by the vanes so that it moves circularly along the end faces of the stator and along the wall of the shell until it exits through vents 48.

The absence of attaching lugs for detachably connecting the end shields to the stator shell provides space for the annuluses 42 without lengthening the casing, and the absence of through bolts for the same purpose permits the employment of large diameter blowers having a running fit with the shell wall and provides an uninterrupted annular space through which cooling air may be moved at high velocity.

The foregoing description and drawing is intended to be illustrative and not limiting, the exclusive use of all modifications within the scope of the appended claims being contemplated.

I claim:

1. In a "take apart," ball bearing, electric motor, a stator, a rotor including a shaft having ball bearings fixed on opposite end portions thereof, a casing comprising a cylindrical stator shell having end portions concentric with the stator bore and bearing supporting end shields at each end thereof, said end shields each having a peripheral rim portion closely fitted on an end portion of said stator shell and each having a central internal recess, a bearing locating ring loosely received in each of said recesses and fixed therein by a hardened adhesive cement, the outer races of said ball bearings being entered into said bearing locating rings in slip fit relationship, and said cement having a soft paste form and being heat hardenable whereby said locating rings may be freely aligned with said rotor concentrically shimmed in said stator bore and with said end shields fitted on the ends of said stator shell when said cement is in soft form, and means forming frangible joints connecting said end shields to said stator shell comprising an adhesive cement between said closely fitting surfaces of said end shield rim portions and stator shell.

2. An electric motor as set forth in claim 1 in which the cement between the closely fitting surfaces of the end shield rims and stator shell is an adhesive epoxy resin having a thin liquid form in which it disperses readily by capillary action over and between closely fitting surfaces and is heat hardenable, whereby it forms in hardened condition frangible joints which securely retain the end shields in position on the stator shell under operating conditions, but which joints may be broken by the application of an axial force thereby permitting the removal of an end shield and disassembly of the motor.

3. A motor as claimed in claim 2 in which said cylindrical stator shell is longer than said stator and extends beyond both ends thereof thereby to provide a clear space at each end of said motor extending from said stator to the adjacent end shield, which space is uninterrupted by end shield attaching means, and including a rotor-driven blower in each of said end spaces, the diameter of which is such as to have a running fit with the inside wall surface of said shell.

4. A motor as claimed in claim 3 which is adapted to horizontal shaft operation, and in which air vents are provided in the lower halves of said end shields and in the lower half of said stator shell at each end thereof between the ends of said stator and said end shields.

References Cited

UNITED STATES PATENTS

| | | | |
|---|---|---|---|
| 1,858,261 | 5/1932 | Barnholdt | 310—63 |
| 2,074,067 | 3/1937 | Darnell | 310—62 |
| 2,604,501 | 7/1952 | Wightman | 310—63 |
| 3,167,672 | 1/1965 | Tupper | 310—90 |
| 3,243,617 | 3/1966 | Cunningham | 310—63 |
| 3,378,709 | 4/1968 | Royer et al. | 310—90 |
| 3,407,317 | 10/1968 | Honsinger | 310—58 |
| 3,437,853 | 4/1969 | Arnold | 310—42 |

WARREN E. RAY, Primary Examiner

U.S. Cl. X.R.

310—43, 52, 88, 89